United States Patent [19]

Webb

[11] Patent Number: 4,988,020
[45] Date of Patent: Jan. 29, 1991

[54] PORTABLE FUELING FACILITY
[75] Inventor: R. Michael Webb, Eau Claire, Wis.
[73] Assignee: U-Fuel, Inc., Eau Claire, Wis.
[21] Appl. No.: 332,462
[22] Filed: Mar. 30, 1989
[51] Int. Cl.[5] .............................. B67D 5/64; B67D 1/16
[52] U.S. Cl. ...................................... 222/608; 222/2; 222/108; 222/173; 141/88
[58] Field of Search ................. 222/2, 14, 74, 108, 222/109, 153, 129–131, 173, 608; 141/86, 88; 220/DIG. 24, 85 S; 280/838

[56] References Cited

U.S. PATENT DOCUMENTS

| | | | |
|---|---|---|---|
| 1,263,751 | 4/1918 | Elkins | 222/155 |
| 2,056,179 | 10/1936 | Fitch | 280/838 |
| 2,189,945 | 2/1940 | Fitch | 220/DIG. 24 |
| 2,259,319 | 10/1941 | Norbon . | |
| 2,327,475 | 8/1943 | Waugh | 222/173 |
| 2,757,823 | 8/1956 | Blanchard et al. | 222/155 |
| 2,784,747 | 3/1957 | Weempe | 280/838 |
| 2,792,148 | 5/1957 | Goldenberg | 222/2 |
| 3,366,280 | 1/1968 | Sampson et al. | 222/173 |
| 3,601,284 | 8/1971 | Yamawaki | 222/2 |
| 3,889,701 | 6/1975 | Mueller | 280/838 |
| 4,131,214 | 12/1978 | Rogers | 222/608 |
| 4,354,620 | 10/1982 | Tsuneda et al. | 222/14 |
| 4,397,405 | 8/1983 | Batson | 222/14 |
| 4,685,327 | 8/1987 | Sharp . | |
| 4,842,139 | 6/1989 | Krieg | 206/386 |

FOREIGN PATENT DOCUMENTS 850828 12/1939 France ......................... 220/DIG. 24

OTHER PUBLICATIONS

Jane's Airport Equipment, Sep. 1986.

*Primary Examiner*—H. Grant Skaggs
*Assistant Examiner*—Steve Reiss
*Attorney, Agent, or Firm*—Merchant, Gould, Smith, Edell, Welter & Schmidt

[57] ABSTRACT

An improved portable fueling facility for aircraft or ground vehicles includes at least one storage tank, an outer tank for providing secondary containment about the storage tanks, a number of saddle members for supporting the outer tank on a flat horizontal surface and at least one pump for dispensing fuel. A deck compartment is provided beneath the pumps for providing secondary containment about the supply pipes which are used to supply the pumps and the refueling tubes which are used to refuel the storage tanks. The entire facility is portable, so that it may be redepolyed at different locations or airports as needed. According to one novel aspect of the facility, a control system is provided which permits self-service use of the facility in a manner which requires only the use of a commercial credit card.

15 Claims, 6 Drawing Sheets

PORTABLE FUELING FACILITY

BACKGROUND OF THE INVENTION

1. Field of the Invention

The present invention relates to an improved portable fueling facility of the type which may be deployed at an airport or other desired refueling location. More specifically, the invention relates to an improved fueling facility which has improved secondary containment characteristics, is easily deployable at a desired location and that does not need an attendant to effect a refueling transaction.

2. Description of the Prior Art

Nearly all modern airports have facilities of some type for refueling. The most prevalent type of aircraft refueling facility includes a below-ground storage tank and an above-ground pumping module which is operated by an attendant, much in the manner of commercial service stations for automobiles.

One significant disadvantage of such in-ground refueling stations was the time and labor involved in preparing such a facility. Some factors which contributed to the expense of constructing such a below-ground facility include the need for construction permits, subcontractors, excavation and the time and planning involved in locating a permanent site for the facility. Once installed, such facilities could not practically be moved to different locations at the airport, to other airports, or be sold.

In recent years, some above-ground refueling facilities have become commercially available. One example is the Edghill Airfield fueling installation which is commercially available from H. W. Edghill Equipment, of Basing Stoke, Hampshire, England. This facility includes a pair of tanks which are manifolded together and are mounted on a hard surface by a skid. A remotely positioned electrically powered dispensing unit is provided to dispense the fuel. However, this dispensing unit also requires the presence of an attendant to monitor the refueling transaction.

In many small airports throughout the United States and the world, it is difficult for a pilot to refuel his or her aircraft at irregular times when an attendant is not present at the airport's refueling facility. As a result, a pilot may be effectively prevented from beginning or resuming a flight until an attendant is again on duty.

In addition, many commercial service stations for automobiles have limited operational hours. When an attendant is not on duty at such stations, a traveler cannot refuel his vehicle.

It is clear there has existed a long and unfilled need in the prior art for a portable above-ground refueling facility for refueling aircraft or ground vehicles which has adequate protection against fuel leakage, is readily deployable at a desired refueling location and does not require an attendant to effect a refueling transaction.

SUMMARY OF THE INVENTION

Accordingly, it is an object of the invention to provide an improved portable aircraft refueling facility which is effective at preventing unwanted fuel leakage, is readily deployable at a desired location and which does not require an attendant to effect a refueling transaction.

In order to achieve these and other objects of the invention, an improved portable fueling facility according to the invention includes a storage tank for storing fuel; an outer tank for providing secondary containment about the storage tank; structure for supporting the outer tank on a flat, horizontal surface; a pump adapted for dispensing fuel into an aircraft or the like; a supply pipe for guiding fuel from the storage tank to the pump; and a deck compartment for supporting the pump, the deck compartment having a space defined therein through which the supply pipe extends, whereby the area around the pump is protected from incidental spillage which could result in contamination or combustion.

According to a second aspect of the invention, an improved portable fueling facility constructed according thereto may also include structure for activating the pump and structure for entering user data, the activating structure being responsive to the entering structure. According to one novel aspect of the invention, the entering structure may include structure for reading a commercial credit card, whereby a refueling transaction can be conducted at any hour of the day or night by a pilot who has such a card.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

BRIEF DESCRIPTION OF THE DRAWINGS

FIG. 8 is a schematic block diagram of a system which is used to control a refueling facility constructed according to the embodiment of FIGS. 1-7.

DETAILED DESCRIPTION OF THE PREFERRED EMBODIMENT(S)

Figure 1:
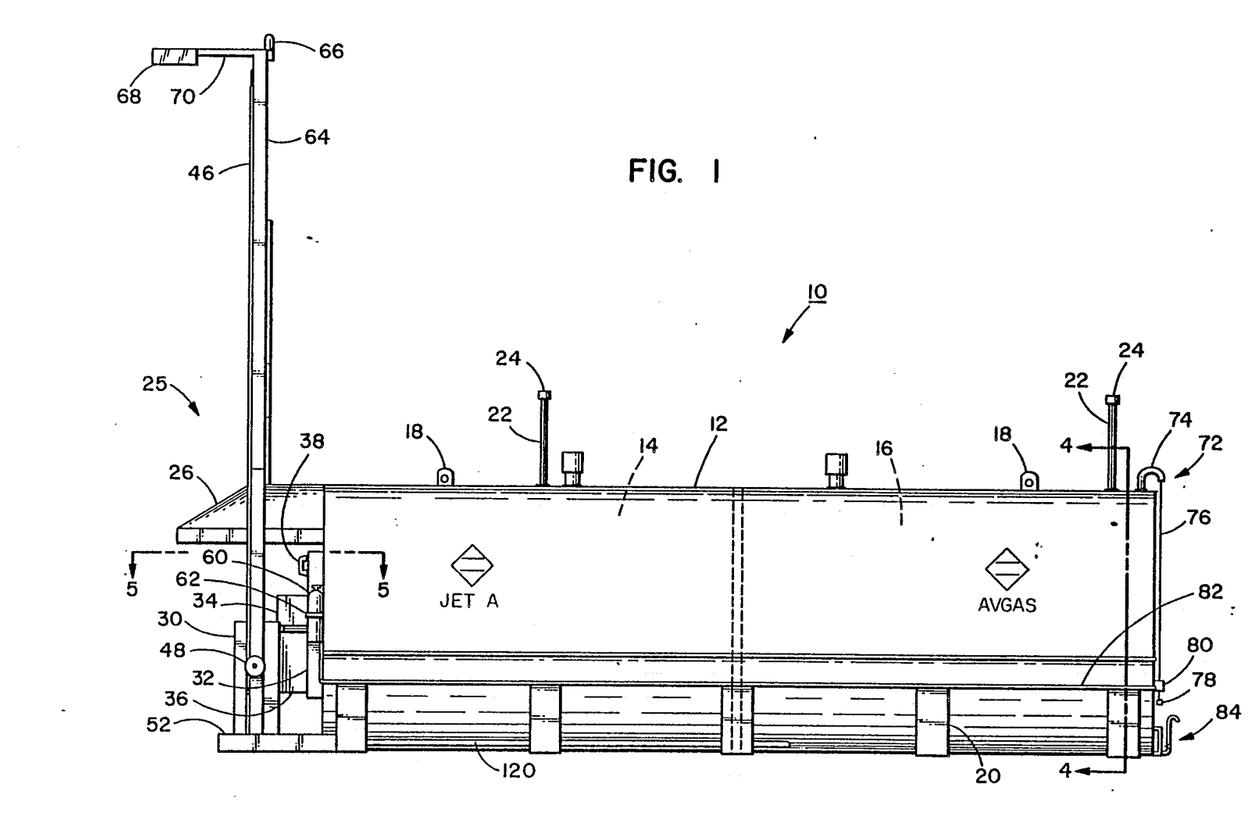
FIG. 1 is a side elevational view of a portable refueling facility constructed according to a preferred embodiment of the invention.

Referring now the drawings, wherein like reference numerals designate corresponding structure throughout the views, and in particular referring to FIG. 1, an improved refueling facility 10 includes an outer tank 12, a front inner storage tank 14 and a rear inner storage tank 16. The front and rear storage tanks 14, 16 are both disposed within outer tank 12, which provides secondary containment about both inner storage tanks 14, 16 in order to provide effective detection and prevention of leakage from the inner tanks 14, 16. A pair of lifting lugs 18 are provided on an upper surface of outer tank 12 in order to permit the facility 10 to be moved via a crane or like lifting device to a desired location. The facility 10 and, more specifically, outer tank 12 is supported relative to a flat horizontal surface such as concrete platform or a paved surface by a plurality of saddle members 20, each of which have a flat lower surface and a concave upper surface which receives a lower portion of outer tank 12. As is illustrated in FIG. 1, both the front storage tank 14 and the rear storage tank 16 are in communication with a respective vent pipe 22 which has a valve 24 mounted at a second end thereof. Valve 24 is constructed to allow air or vapors to flow into and out of the respective tank 14, 16. However, valve 24 acts as a one-way check valve to prevent fuel from leaving vent pipe 22 during refilling or expansion. This is accomplished by a float actuator within valve 24 which causes the valve to seat when the fuel reaches a certain level within valve 24.

Figure 2:
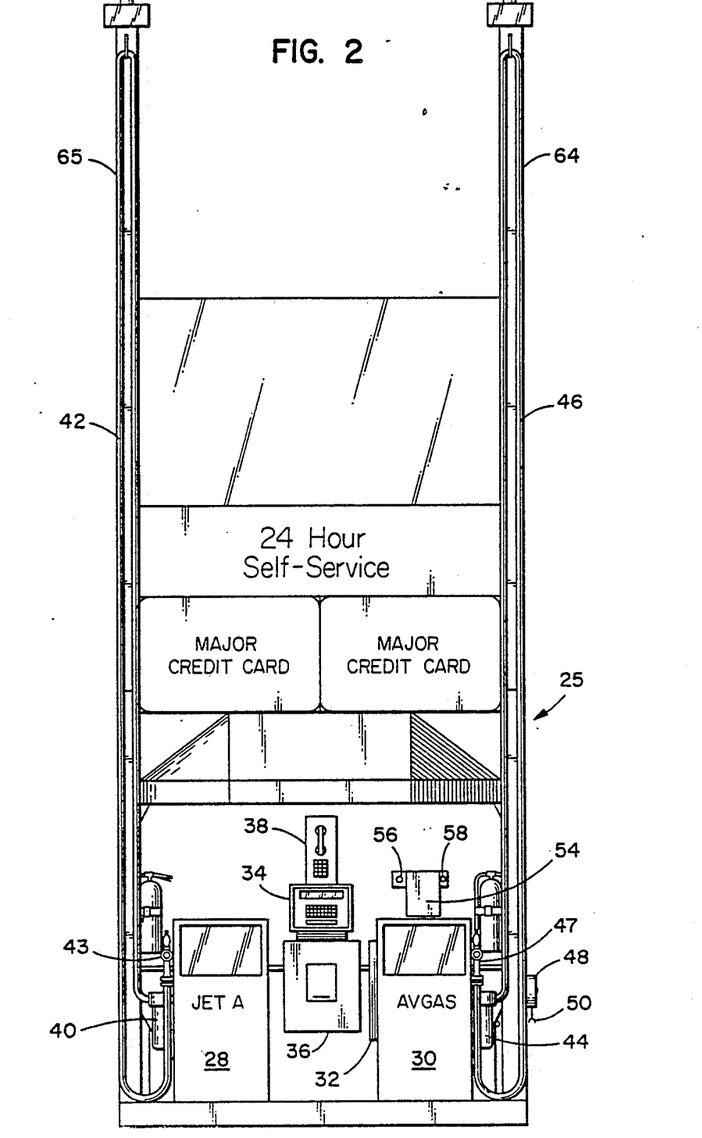
FIG. 2 is a front elevational view of the facility depicted in FIG. 1.

Referring briefly to FIG. 2, facility 10 includes a fueling station 25 which has a protective canopy 26, a first pump 28 and a second pump 30 which are beneath the canopy 26. In the illustrated embodiment, first pump 28 is dedicated to the front storage tank 14 and is used to dispense jet A fuel, while second pump 30 is dedicated to rear storage tank 13 and is used to dispense AVGAS. Operation of both pumps 28, 30 is controlled by means of a pump control unit 32 in a manner which will be described in greater detail below.

One attractive feature of a fueling facility constructed according to the invention is its capability to accommodate self-service refueling by accepting major commercial credit cards. To effect this capability, a credit card reader 34 is provided in fueling station 25. A receipt printer 36 is positioned beneath card reader 34 to provide a tangible verification of the refueling transaction to the pilot for his or her financial records. A telephone 38 is provided above card reader 34 in order to enable a pilot to communicate any inquiries or complaints to a central customer support facility.

In operation, first pump 28, when activated, will pump fuel from front storage tank 14 through a first filter unit 40 into a first hose 42 to a nozzle 43, which may be held by the pilot during the refueling process. Similarly, second pump 30, when activated, pumps fuel from rear storage tank 16 through a second filter unit 44 into a second hose 46 to a nozzle 47. Nozzle 47 may also be of the hand-held type, in which case an operator may hold the nozzle 47 during refueling. Alternatively, nozzle 47 may be of the type which is securable to the refueling port in an airplane. In this second case, the operator is required to depress a dead man switch 58 during the entire refueling process in order to permit operation of pump 30. In this way, refueling is disrupted should an unexpected emergency occur.

Before refueling, an operator will ground the aircraft by means of a cable attachment 50 which is unwindable from a grounding reel 48, as is shown in FIGS. 1 and 2. Grounding reel 48 is electrically connected to the frame of fueling facility 10. As a result, arcing between facility 10 and the aircraft due to differences in electrical potential therebetween is prevented.

Referring again to FIG. 1, it will be observed that pumps 28, 30 are mounted upon a deck compartment 52, the construction of which provides important advantages according to the invention. Deck compartment 52 defines a compartment or space therein through which the fuel lines between tanks 14, 16 and pumps 28, 30 respectively pass. As a result, secondary containment is achieved throughout the entire fueling facility 10.

Referring briefly to FIG. 2, fueling station 25 further includes an electrical panel 54 through which electrical lines for operating the pumps 28, 30, card reader 34, receipt printer 36 and pump control unit 32 are routed. An emergency shut-off switch 56 is provided adjacent electrical panel 54, as is the dead man switch 58 that has previously been discussed. A pair of fire extinguishers 60 are further mounted at fueling station 25 by a respective pair of clamps 62 as is shown in FIGS. 1 and 2.

Another novel aspect of the invention concerns a novel fueling hose retracting arrangement which includes a pair of retractor columns 64, 65 which are mounted at outer ends of fueling station 25 adjacent pumps 30, 28 respectively. Each retractor column 64 includes an aircraft warning light 66, an illumination source 68 and an arm 70 for supporting illumination source 68. The construction of the hose retracting arrangements within retractor columns 64, 65 is discussed in greater detail below.

In order to monitor the fuel level in rear storage tank 16, a tank gauge 72 includes a tape 76 which is attached to a float within tank 16 and extends from tank 16 to a position outside outer tank 12 through a gauge tape housing 74. Tape 76 is urged downwardly by a weight 78. By observing the position of weight 78, the fuel level within rear storage tank 16 can be determined. In addition, a leak detection gauge 84 is provided for measuring the amount of fluid which has collected in the interstitial space between tanks 14, 16 and the outer tank 12. The operation of leak detection gauge 84 will be discussed in greater detail below.

Figure 3:
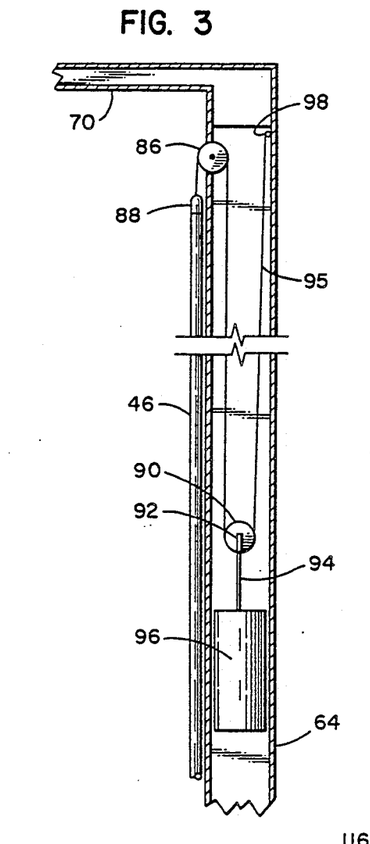
FIG. 3 is a diagrammatical view illustrating operation of a hose retractor mechanism in an apparatus constructed according to the embodiments of FIGS. 1 and 2.
Figure 4:
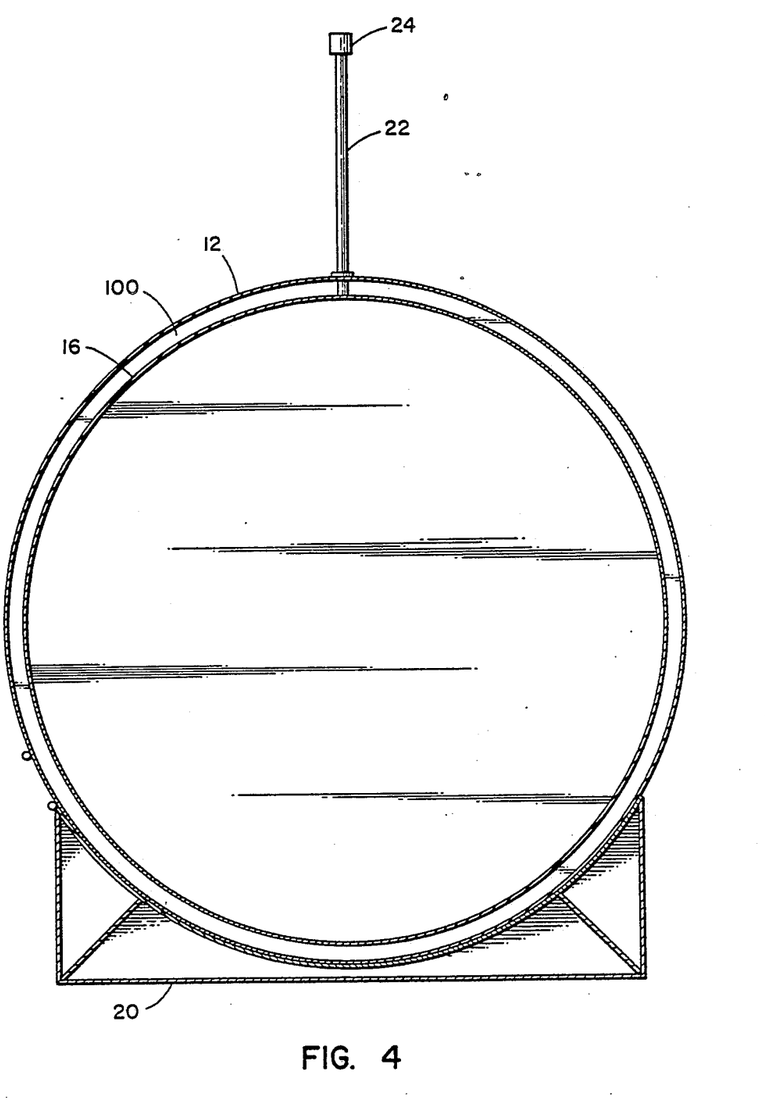
FIG. 4 is a cross-sectional view taken along lines 4—4 in FIG. 1.

Referring now to FIG. 3, the specifics of the hose retractor arrangement that is positioned within both retractor columns 64, 65 will now be discussed. The retractor arrangement includes a first pulley 86 which is rotatably mounted to a retractor column 64. A swivel-type hose support bracket 88 is used to support a central portion of a respective one of the fueling hoses 42, 46, as is shown in FIG. 3. A second counterweight pulley is rotatably mounted to a connecting rod 94 by means of a clevice 92. Connecting rod 94 is in turn secured to a counterweight 96 which is of sufficient mass to exert a relatively strong downward force on counterweight pulley 90. A retractor cable 95 is secured to hose support bracket 88 at a first end thereof and has a second end which is secured to retractor column 64 by a cable tie-down member 98. Cable 95 stretches over the first and second pulleys 86, 90 in the manner illustrated in FIG. 3 so that the weight of counterweight 96 is transmitted to support bracket 88 in the form of an upward bias which causes the hose 46 to be withdrawn to a retracted position until a greater downward force is exerted thereon by an operator during the refueling process. It should be noted that the pulley arrangement described above and illustrated in FIG. 3 constitutes a force magnification linkage which applies twice the amount of upward force on hose 46 than is exerted downwardly by counterweight 96. The above-described retraction arrangement provides a smooth non-disruptive retraction force, which insures that the respective hoses 42, 46 will be withdrawn from an aircraft when an operator ceases to impart downward force to nozzles 43, 47, respectively.

Figure 5:
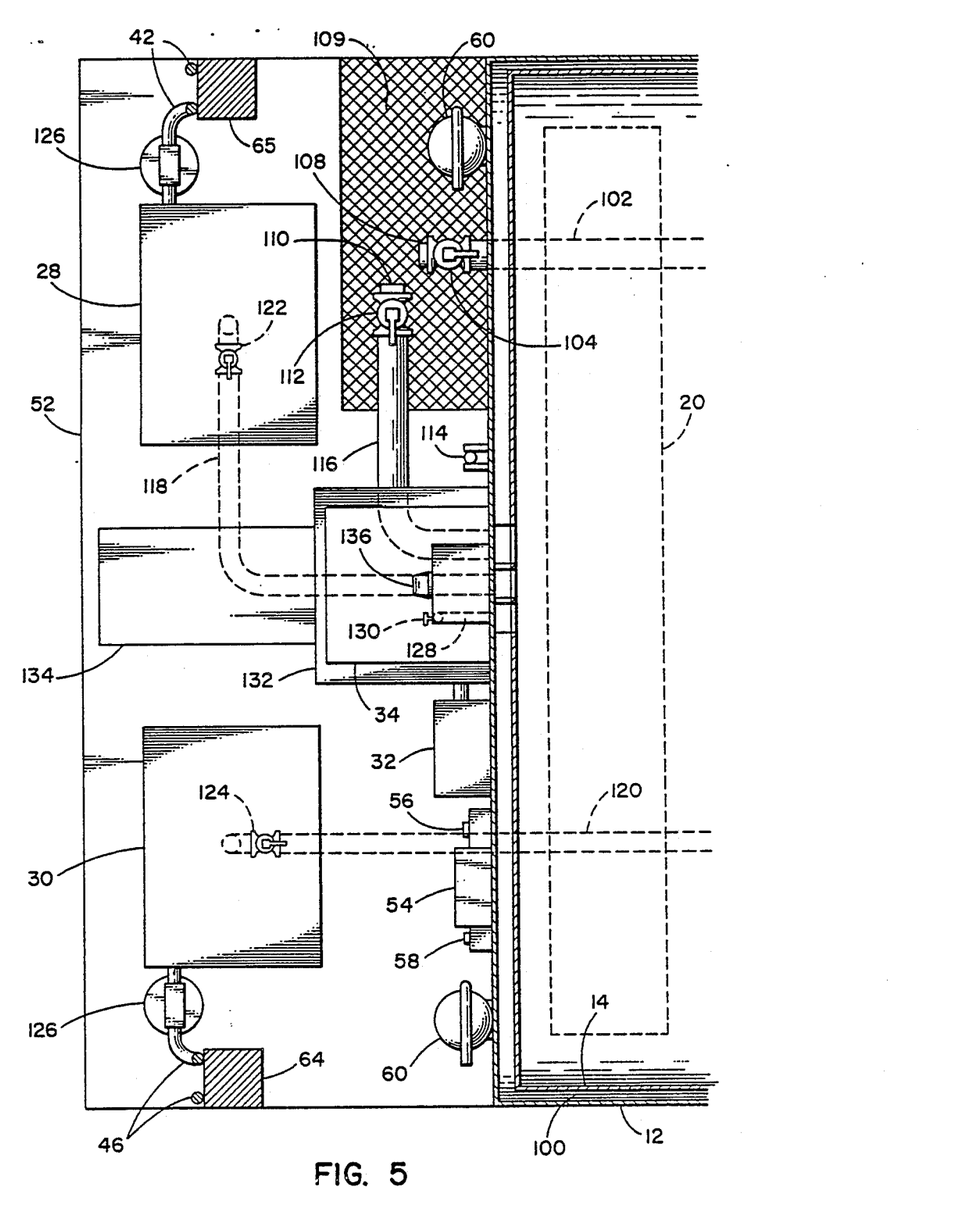
FIG. 5 is a fragmentary cross-sectional view taken along lines 5—5 in FIG. 1.

Referring now to FIG. 5, a fragmentary cross-sectional view looking down into an end portion of front storage tank 14 and deck compartment 52 depicts the interstitial space 100 which is defined between the front storage space 14 and outer tank 12. As is shown in FIG.

5, a rear tank fill tube 102 extends from the rear storage tank 16 to a nipple end 108. A gate valve 104 is interposed in fill tube 102 between rear tank 16 and nipple 108. When it is desired to refill rear tank 16, a source of fuel is connected to nipple 108 and gate valve 104 is opened, thereby permitting fuel to be pumped from the refueling source into rear tank 16 via fill tube 102. Similarly, a front tank fill tube 116 is provided in communication with front tank 14. Front tank fill tube 116 has a nipple end portion 110 and a gate valve 112 interposed between nipple portion 110 and the remainder thereof. When it is desired to refill front storage tank 14, an appropriate source of fuel is connected to nipple 110 and gate valve 112 is opened, thereby permitting fuel to be pumped into front storage tank 14.

As is shown in FIG. 5, both nipples 108, 110 are positioned above a grate 109 which permits fuel that is spilled during refilling to drop down into deck compartment 52. In this way, deck compartment 52 acts as a secondary containment for fuel spillage during refilling of tanks 14, 16.

In order to provide fuel from front storage tank 14, a front tank supply pipe 118 is connected to first pump 28, as is shown in FIG. 5. A valve 122 is provided within front tank supply pipe 118 in order to cut off the supply of fuel to first pump 28 during maintenance or in the event of an emergency. Similarly, a rear tank supply pipe 120 communicates rear tank 16 with second pump 30 and has a valve 124 interposed therein. Both pipe 118 and pipe 120 are routed through deck compartment 52 in order to provide secondary containment for fuel which is drawn therethrough.

Figure 6:
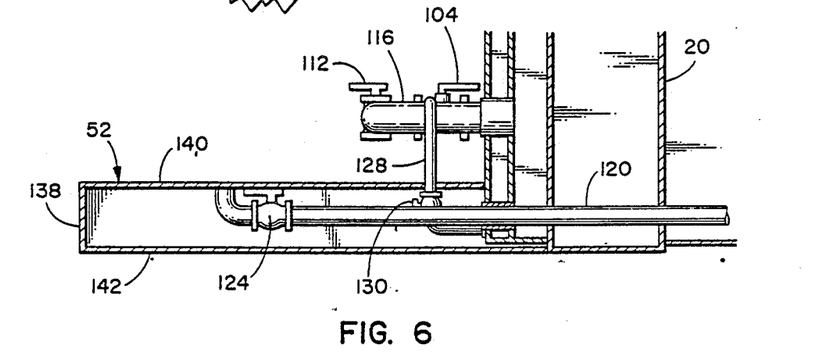
FIG. 6 is a cutaway view of the deck compartment illustrated in the embodiments of FIGS. 1-5.

Referring now to FIG. 6, a water draw off line 128 having a valve 130 interposed therein is provided for drawing water off a bottom portion of first tank 14 in a manner that is known to those skilled in the art. Rear tank 16 is provided with a similar water draw off arrangement, as will be discussed below. An inspection hatch 134 is provided in deck compartment 52 for providing access during maintenance, refilling or in an emergency. As is best shown in FIG. 6, deck compartment 52 includes an end wall 138, an upper wall 140 and a lower wall 142. These walls along with a pair of side walls (not shown) define a compartment or space which provides secondary containment for the rear tank fill tube 102, the front tank fill tube 116, and for spillage from the front tank supply pipe 118 and the rear tank supply pipe 120. As a result, the facility 10 provides a high degree of safety and protection from accidental spillage or combustion due to fuel linkage.

Figure 7:
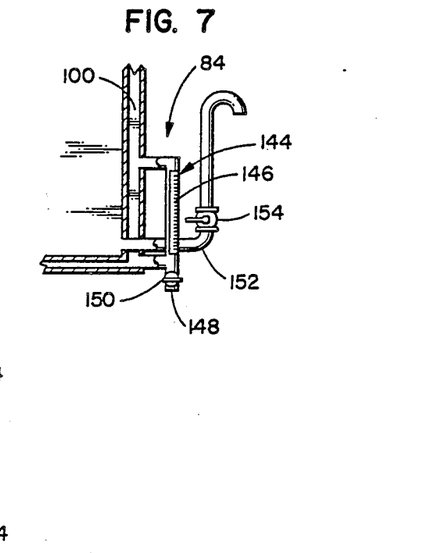
FIG. 7 is an enlarged fragmentary view of the leak detection gauge depicted in FIG. 1.

Referring now to FIG. 7, the construction of leak detection gauge 84 will now be discussed. Leak detection gauge 84 includes a transparent gauge tube 144 which is in communication with the interstitial space between second tank 16 and outer tank 12. Gauge tube 144 has measuring indicia 146 provided thereon for accurately measuring the level of fluid within gauge tube 144. A drain tube 148 extends downwardly from gauge tube 144 and has a valve 150 provided therein. As a result, leak detection gauge 84 can also be used to drain unwanted fluid from within the interstitial space 100. Also depicted in FIG. 7 is the water draw off line 152 which is provided for the rear tank 16. Line 152 has a valve 154 interposed therein and functions in a manner which is known to those skilled in the art.

Referring now to FIG. 8, a system for controlling the first and second pumps 28, 30, which are labeled as $P_1$ and $P_2$, respectively for purposes of FIG. 8 will now be described. As is depicted in FIG. 8, card reader 34 is in communication with a central processing unit 156. Central processing unit 156 is arranged to instruct a pump control unit 158 when it is permissible to actuate one of the pumps $P_1$, $P_2$. A remote service center 160 can monitor and/or instruct CPU 156 on one or any refueling transactions which take place. Service center 160 is further in two-way voice communication with telephone 38. All transactions which occur at the improved facility 10 are recorded in a log 162, which is provided with information from the central processing unit 156. Receipt printer 34 is also given instructions by the central processing unit 156. Pump control unit 158 may further be responsive to the input of dead man switch 58 in the manner which is described above.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. An improved non self-propelled portable fueling facility comprising:
   storage tank means for storing fuel;
   outer tank means for providing secondary containment about said storage tank means;
   means for supporting said outer tank means on an underlying surface wherein said means for supporting includes a fixed lower surface for engaging the underlying surface;
   pump means adapted for dispensing fuel into an aircraft or the like;
   supply pipe means for guiding fuel from said storage tank means to said pump means; and
   deck compartment means for supporting said pump means with respect to the underlying surface, said deck compartment means being connected to said outer tank means, and having a compartment defined therein through which said supply pipe means extends, whereby the area around said supply pipe means is protected from incidental spillage which could result in contamination or combustion.

2. A portable facility according to claim 1, wherein said pump means comprises a pump, a fueling hose connected to said pump and a nozzle connected to a second end of said fueling hose which is distal from said pump.

3. A portable facility according to claim 2, further comprising means for biasing said fueling hose toward a retracted position, whereby the refueling process is simplified and safened.

4. A portable facility according to claim 3, wherein said biasing means comprises a retractor column, means for supporting said fueling hose at a central portion thereof, and means for urging said supporting means toward an upper portion of said retracting column.

5. A portable facility according to claim 4, wherein said urging means comprises a cable having a first end attached to said supporting means, a first pulley which is mounted on said retractor column for guiding said cable and counterweight means for exerting a downward force on said cable on a side of said first pulley which is opposite said supporting means.

6. A portable facility according to claim 1, further comprising means for activating said pump means and means for entering user data, said activating means being responsive to said entering means.

7. A portable facility according to claim 6, wherein said activating means is further adapted to be responsive to signals which are generated at a site which is remote from said portable facility.

8. A portable facility according to claim 6, wherein said entering means comprises means for reading a commercial credit card.

9. A portable facility according to claim 1, further comprising lifting lug means attached to an upper portion of said outer tank means, whereby the facility may be positioned at a desired location by a crane or like lifting mechanism.

10. A portable facility according to claim 1, wherein said supporting means comprises a plurality of saddle members, each of said saddle members having a substantially flat lower surface which is adapted for engaging underlying surface and a concave upper surface which receives said outer tank means and wherein said fixed lower surface of said means for supporting comprises said flat lower surfaces of said saddle members.

11. A portable facility according to claim 1, wherein said storage means comprises a front fuel storage tank and a rear fuel storage tank.

12. A portable facility according to claim 1, wherein an interstitial space is defined between said outer tank means and said storage tank means, and further comprising means for monitoring fluid level in said interstitial space.

13. A portable fueling facility according to claim 1, further comprising means adapted for grounding an aircraft or like vehicle to the facility during refueling.

14. A portable facility according to claim 1, further comprising means for monitoring fuel level in said storage tank means.

15. An improved portable fueling facility, comprising:

storage tank means for storing fuel;

outer tank means for providing secondary containment about said storage tank means;

means for supporting said outer tank means on a flat, horizontal surface;

pump means adapted for dispensing fuel into an aircraft or the like;

refilling pipe means adapted for guiding fuel from an exterior source to said storage tank means; and deck compartment means beneath said pump means for providing containment and protection against spillage from said pump means, said deck compartment means being connected to said outer tank means and having a compartment defined therein, said deck compartment means further comprising grate means on an upper surface thereof, said grate means being positioned beneath said refilling pipe means, whereby said deck compartment means provide secondary containment for any fuel which is spilled during refilling.

* * * * *

UNITED STATES PATENT AND TRADEMARK OFFICE
CERTIFICATE OF CORRECTION

PATENT NO. : 4,988,020

DATED : January 29, 1991

INVENTOR(S) : R. Michael Webb

It is certified that error appears in the above-identified patent and that said Letters Patent is hereby corrected as shown below:

Column 2, line 57,
    INSERT --to-- after "now"

Column 3, line 3,
    INSERT --a-- after "as"

Column 6, line 42,
    INSERT --,-- after "means"

Signed and Sealed this

Third Day of November, 1992

Attest:

DOUGLAS B. COMER

*Attesting Officer*    *Acting Commissioner of Patents and Trademarks*